UNITED STATES PATENT OFFICE.

PHILLIPS THOMAS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

METHOD OF MAKING CONDENSERS.

1,365,292.  Specification of Letters Patent.  Patented Jan. 11, 1921.

No Drawing.  Application filed April 18, 1919. Serial No. 291,163.

*To all whom it may concern:*

Be it known that I, PHILLIPS THOMAS, a citizen of the United States, and a resident of Edgewood Park, in the county of Allegheny and State of Pennsylvania, have invented a new and useful Improvement in Methods of Making Condensers, of which the following is a specification.

My invention relates to static electric condensers and it has particular relation to the dielectric material thereof. The primary object of my invention is to provide a method by which condensers may be impregnated with a wax having desirable dielectric qualities but which it has been difficult to employ, heretofore, as an impregnating agent.

It has been found that Montan wax possesses highly desirable qualities, as a dielectric for condensers. For example, the wax melts between 80° and 86° C. and has specific inductive capacity of 4 to 4.5, which properties are possessed by relatively few available waxes. I have found, however, that it is difficult to impregnate fibrous material with Montan wax and this difficulty is believed to exist on account of the high surface tension of the wax. In view of this, I provide, by my invention, a method by which Montan wax may be employed as an impregnating agent with fibrous material by obviating the difficulties encountered because of its high surface tension.

Although my invention is particularly adapted for impregnating condensers, it may be employed to impregnate fibrous material which may be afterward utilized for any desirable purpose. In order to clearly set forth my process, I shall describe it, herein, in connection with the manufacture of condensers but it may be employed, in substantially the same manner, in the manufacture of other similar articles.

In making static condensers, alternate sheets of conducting material, such as metal foil, and non-conducting material, such as paper, are usually stacked to a suitable thickness and the body thus formed is impregnated with a suitable dielectric in a liquid state. A wax is usually employed as the dielectric and, after the stacked material has been thoroughly impregnated therewith, the body is removed from the wax and subjected to pressure to remove excess wax, after which it is allowed to cool, preferably, in the press employed to remove the excess wax.

In practising my invention, I may prepare a solution of impregnating material comprising benzol and Montan wax. In preparing such a solution, the Montan wax is preferably melted and mixed with a desirable quantity of benzol. I have found that suitable proportions of benzol and Montan wax are substantially one quart of the benzol to three ounces of solid wax or an equivalent amount when melted. In order to prepare the Montan wax and benzol solution, the mixture is heated to a temperature of substantially 120° C., but after the solution has been prepared, it may be allowed to cool to room temperature of approximately 19 or 20° C. A condenser comprising stacked sheets of fibrous material and conducting material may be soaked in such solution for substantially twelve hours, after which it may be removed and subjected to pressure in a press to squeeze out the excess solution. The condenser may then be completely immersed in a bath of commercially pure Montan wax which may be heated to substantially 160° C. The condenser may be allowed to remain in the bath for approximately six hours, after which it may be removed and cooled under pressure.

By following the above described process, I have found that the condenser is thoroughly impregnated and possesses a high dielectric strength as well as a high electrostatic capacity. The above described process was discovered after making tests which disclosed the fact that the Montan wax possessed a high surface tension which nullified the capillary attraction occasioned by the small openings in the paper which are the cause of impregnation by ordinary compounds. By first employing the benzol solution, a relatively small quantity of Montan wax is carried into the pores of the paper and by subsequently immersing it in commercially pure Montan wax, the high surface tension is utilized to cause thorough impregnation of the fibrous material by the wax.

Furthermore, on account of the fact that Montan wax is but slightly soluble in benzol, it is possible to drive off the benzol when the condenser is immersed in the bath of Montan wax which is maintained at a sufficiently high temperature to volatilize the benzol. Moreover, the escape of the benzol creates a high vacuum in the condenser which facilitates the entrance of the melted Montan wax of the bath, this action being aided by the high surface tension possessed by the wax carried into the fibrous material by the benzol and that of the bath.

Although I have specifically described a process which may be employed in impregnating fibrous material with Montan wax, it is obvious that minor changes may be made therein without departing from the spirit of my invention and I desire, therefore, that no limitations shall be imposed except such as are indicated in the appended claims.

I claim as my invention:

1. A method of impregnating condensers that comprises immersing the condensers in a solution of benzol and Montan wax, removing them after impregnation, immersing the condensers in a bath of commercially pure Montan wax, maintaining the bath at substantially 160° C., removing the condensers therefrom and subjecting them to pressure in a cold press.

2. A method of impregnating condensers that comprises mixing benzol with Montan wax at a temperature of substantially 120° C., allowing the solution to cool to approximately 20° C., immersing the condensers in the solution for approximately twelve hours, removing them and immersing them in a bath of Montan wax maintained at a temperature sufficiently high to volatilize the benzol.

3. A method of impregnating condensers that comprises mixing benzol with Montan wax at a temperature of substantially 120° C., allowing the solution to cool to approximately 20° C., immersing the condensers in the solution for approximately twelve hours, removing them and immersing them in a bath of Montan wax maintained at a temperature of substantially 160° C. and removing the condensers from the bath after about a six-hour treatment.

In testimony whereof, I have hereunto subscribed my name this 5th day of April, 1919.

PHILLIPS THOMAS.